United States Patent [19]

Kishi et al.

[11] 4,329,559
[45] May 11, 1982

[54] RESISTANCE WELDER

[75] Inventors: Tomomi Kishi; Yoshitaka Yamamoto, both of Toyota, Japan

[73] Assignee: Toyota Jidosha Kogyo Kabushiki Kaisha, Aichi, Japan

[21] Appl. No.: 165,945

[22] Filed: Jul. 3, 1980

[30] Foreign Application Priority Data

Jul. 5, 1979 [JP] Japan .................. 54-084431

[51] Int. Cl.³ .................. B23K 11/10; H01R 41/00
[52] U.S. Cl. .................. 219/89; 339/9 E
[58] Field of Search .......... 219/89; 339/9 R, 9 A, 339/9 E

[56] References Cited

U.S. PATENT DOCUMENTS

| 2,881,403 | 4/1959 | Vltavsky | 339/9 E |
| 3,287,538 | 11/1966 | Dicks | 219/89 |
| 3,538,294 | 11/1970 | Dicks et al. | 219/89 |
| 4,260,868 | 4/1981 | Day | 219/89 X |

FOREIGN PATENT DOCUMENTS 725843 4/1980 U.S.S.R. .................. 219/89

Primary Examiner—J. V. Truhe
Assistant Examiner—Keith E. George
Attorney, Agent, or Firm—Browdy and Neimark

[57] ABSTRACT

In effecting resistance welding, fluid pressure is applied to a piston in a cylinder to drive the piston rod ahead so that work being welded is clamped between an electrode provided at the end of the rod and another electrode carried by an arm to apply a suitable welding pressure to the work. As the piston is further moved ahead, a collector ring is expanded radially outwardly to make electrical contact with the power feeding liner, so that welding current fed from a feeder cable is supplied to the electrode through the cylinder, feeding liner, collector ring, collector plate and the rod, thereby to effect the welding while applying a suitable pressure to the work.

4 Claims, 2 Drawing Figures

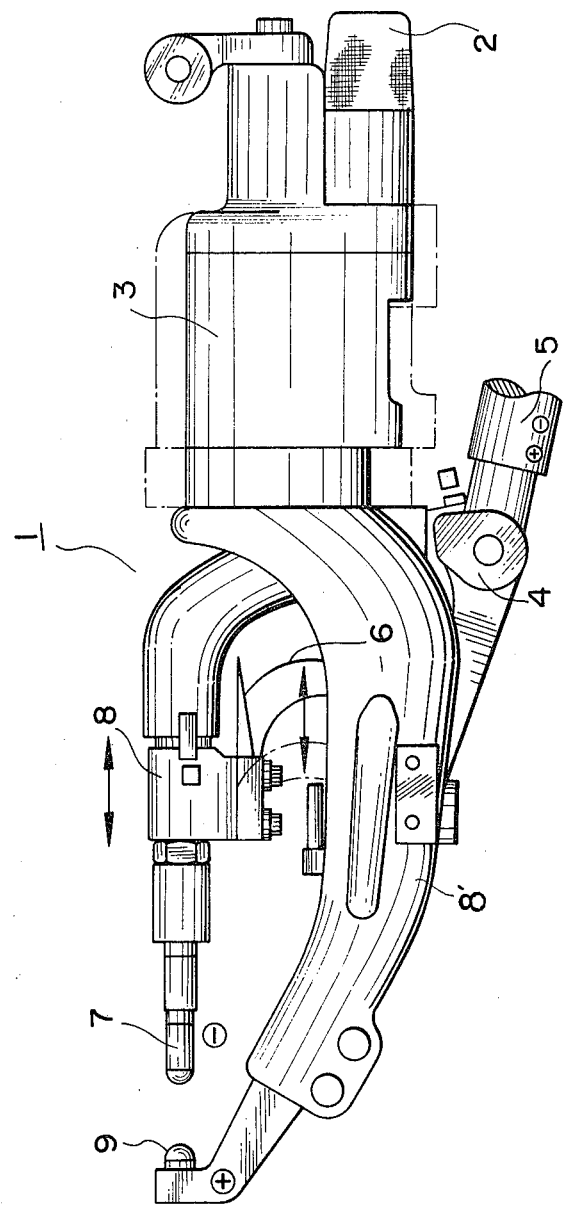
FIG. I
PRIOR ART

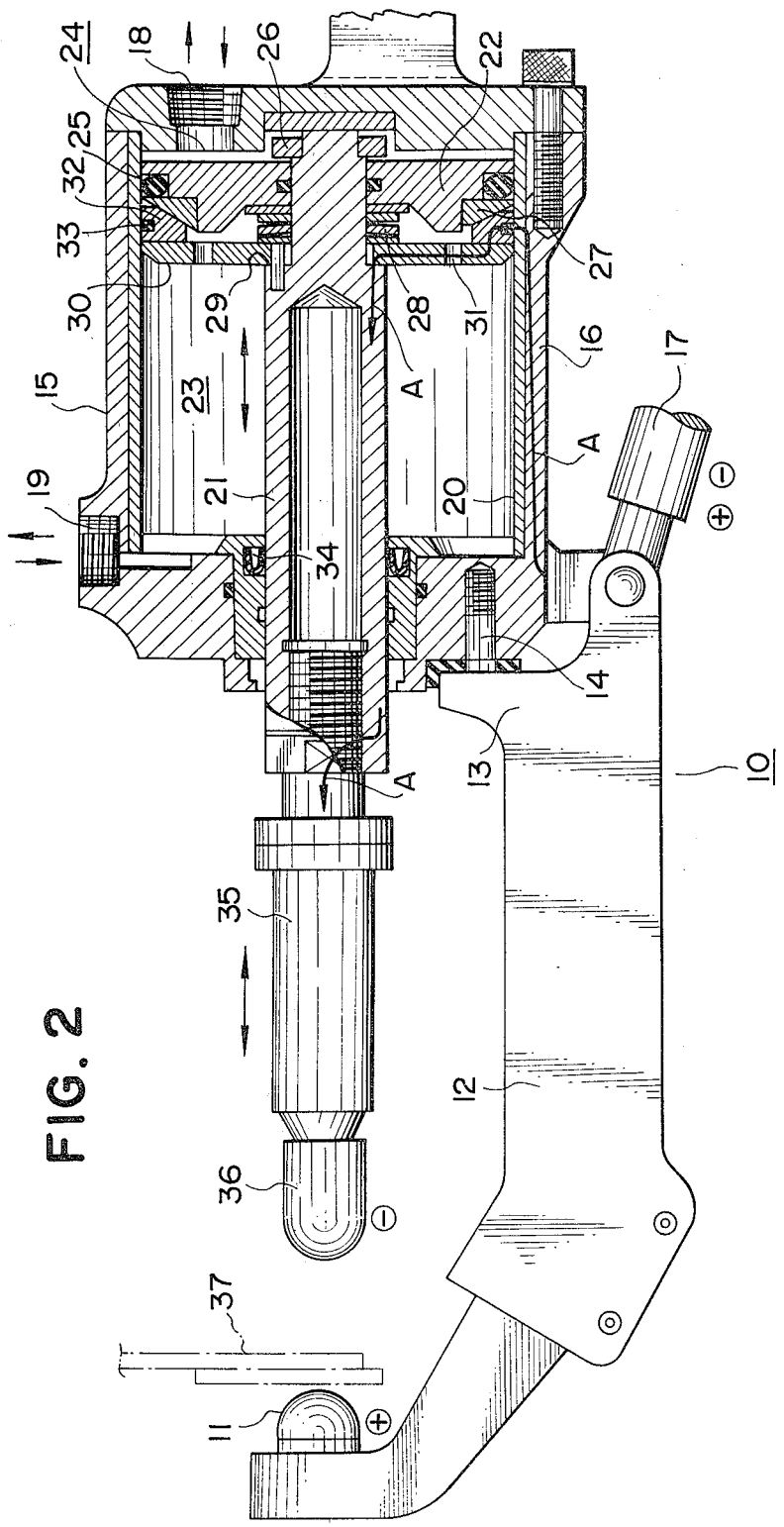

RESISTANCE WELDER

BACKGROUND OF THE INVENTION

Field of the Invention

The present invention relates to a portable gun type resistance welder and, more particularly, to a resistance welder in which the path for electric current is formed in a pressurizing cylinder to eliminate the flexible cable tube connected to the piston rod side electrode.

Description of the Preferred Embodiments

Resistance welding is broadly adopted in spot welding or the like purpose as is well known. Among the resistance welders, a so-called portable gun type resistance welder is used most commonly because of its advantages such as easiness of welding operation, simple construction and low cost.

FIG. 1 shows a typical example of conventional portable gun type resistance welder 1. This welder 1 has a hydraulic cylinder as a pressurizing cylinder 3 for passing through the weld part between two metals a large welding electric current and to prevent the generation of heat due to a decrease in the surface contact pressure. The pressurizing cylinder 3 is provided with a valve 2. Electric power feeding cables 5 are connected to the cylinder 3 through an attaching bracket 4. One of the cord cables of the electric power feeding cables 5 is connected through a flexible tube 6 to an arm 8 which carries at its one end an electrode 7 and which is fixed to a piston rod (not shown) to extend forwardly therefrom. The other cord cable is connected to an arm 8' carrying the other electrode 9 and fixed to the cylinder 3 to extend therefrom forwardly.

This conventonal resistance welder, however, suffers a problem that a secular damage of the flexible tube 6 is inevitable due to the back and forth movement of the arm 8 which is unitary with the piston rod, the movement occurs as a natural result of the extraction and retraction of the piston of the pressurizing cylinder for attaining a sufficiently high surface pressure, requiring a frequent renewal of the flexible tube 6 to incur a deterioration of the efficiency of the work. In addition, it is necessary to preserve a considerably large installation space for the flexible tube, taking into consideration the flexing of the flexible tube. This goes quite contrary to the demand for a compact construction of the resistance welder and incurs a rise of the cost.

Furthermore, there is a danger of leak of electric current due to a breakage of the flexible part of the flexible tube. To avoid this, troublesome protective maintenance work is required.

SUMMARY OF THE INVENTION

It is, therefore, a major object of the invention to overcome the above-described problems of the conventional portable gun type resistance welder.

It is another object of the invention to provide a safe, compact and highly durable resistance welder in which the pressurizing cylinder is used also as a power feeding cylinder to permit the cord cable tube connected to the movable rod to be eliminated.

To these ends, according to the invention, there is provided a resistance welder in which the welding is effected by positioning an electrode attached to a pressurizing cylinder and another electrode attached to an arm closely to each other. More specifically, the invention provides a portable gun type resistance welder in which the pressurizing cylinder plays also the role of an electric power feeding cyclinder and a collector ring slidingly contacts the power feeding liner of the cylinder case as well as a collector plate of a power supply rod to effect a pressurizing operation in conjunction with the the back and forth movement of the piston in the pressurizing cylinder.

BRIEF DESCRITPION OF THE DRAWINGS

FIG. 1 is a schematic illustration of a portable gun type resistance welder of the prior art; and FIG. 2 is an illustration of the first embodiment of the invention showing in section an essential part thereof.

DESCRIPTION OF THE PREFERRED EMBODIMENTS

Referring to FIG. 2, a reference numeral 10 generally denotes a portable gun type resistance welder of the invention. An arm carrying one of the electrodes, i.e. anode 11, is fixed at its base portion 13 to the front cylinder case 16 of a pressurizing cylinder 15 which plays also the role of an electric power feeding cylinder, by means of a bolt 14. The arm 12 supports a power feeding cable 17 containing the cords for both electrodes.

The pressurizing cylinder 15 is provided at its one side with a pressurizing liquid supply port 18 connected to a predetermined liquid source through a solenoid valve and, at its other side, with a retracting liquid supply port 19. These ports are connected to liquid supply nipples.

A cylindrical conductive power feeding liner 20 is disposed in the barrel portion of the cylinder case 15. The feeding liner 20 slidably accomodates a piston 22 which is cantilevered by a conductive rod 21 and adapted to be moved relatively to the latter by a predetermined distance. A sealing member 25 is fitted around the piston 22. A retracting chamber 23 and a pressurizing chamber 24 are formed at the front and rear sides of the piston 22.

A reference numeral 26 denotes an anti-dropping ring constituting the stopper of the piston 22 with respect to the rod 21. A pressure ring 27 having a rearwardly tapered surface is fitted around the front surface of the piston 22 as illustrated. Also, a disc-shaped spring 28 is attached to the center of the piston 22 to press a conductive collector plate 30 against the step 29 of the rod 21.

A reference numeral 31 denotes a communication port which is designed to equalize the pressure across the collector plate 30.

A conductive collector ring 32 contacts the periphery of rear face of the collector plate 30 and has a tapered surface which abuts the aforementioned tapered surface of the pressure ring 27. The conductive collector ring 32 is divided in the circumferential direction into a plurality of segments and is biased radially inwardly so as to be normally kept out of contact with the feeding liner 20.

The rod 21 extends forwardly from the front wall of the cylinder case 16 through a seal 34, and carries a cathode 36 through the medium of a conductive shunk 35. The cathode 36 opposes to the aforementioned anode 11 coaxially with the latter.

The anode cable of the feeder cable 17 is connected to the anode 11 through the arm 12, while the cathode cable is suitably fixed to the cylinder case 16.

In the above-described construction, the portion of metals 37 to be welded is placed between the electrodes 11,36 on the common axis of these electrodes. Then, the working fluid such as pressurized oil is supplied through the liquid supply port 18 by operation of the solenoid valve while the fluid is discharged from the liquid supply port 19, so that the piston 22 is urged by the pressure acting in the pressurizing chamber 24 to move the rod 21 ahead through a disc spring 28 and a collector plate 30. In consequence, the electrode 36 together with the shank 35 pressurizes the work 37 against the electrode 11 to clamp the work therebetween.

As the pressurizing is continuted even after the clamping, the piston 22 is moved relatively to the rod 21 so that the tapered surface of the pressure ring 27 presses against the tapered surface of the collector ring 32 overcoming the force of the disc-shaped spring 28. Due to a wedging action caused by the engagement between the two tapered surfaces, the segments of the collector ring are moved radially outwardly overcoming the force of the ring 33 to come into contact with the feeding liner 20.

In consequence, the electric current flows from the cathode cord of the feeder cable 17 to the cathode 36 via the cylinder case 16, feeding liner 20, collector ring 32, collector plate 30, rod 21 and the conductive shank 35, whereas the current from the anode cord reaches the anode 11 through the arm 12. In consequence, the electric current is made to flow across the work 37 under pressure, thereby to effect the resistance welding.

Since the collector plate 30 is pressed through the piston 22, pressure ring 27 and the collector ring 32, it is bent forwardly due to a bending moment caused by the step 29 of the rod 21 thereby to compensate for the reduction of the pressurizing force attributable to the reduction of the thickness of the work. The pressures at both sides of the collector plate 30 are equalized by means of a communication port 31.

After the completion of the welding, the solenoid valve is switched to supply the working fliud through the retracting liquid supply port 19 and to discharge same from the liquid supply port 18. In consequence, the piston 22 is restored to its original position by means of the disc-shaped spring 28, so that the piston 22 is retracted through the communication port 31, and the rod 21 is returned and reset through the anti-dropping member 26.

Meanwhile, since the piston 22 is returned from the collector plate 30, the collector ring 32 is made to shrink radially inwardly by the action of the ring 33.

The above-described embodiment is not exclusive and various changes and modifications may be imparted thereto. For instance, it is possible to use a coiled spring instead of the disc-shaped spring. It is also possible to change the size and material of the various parts. It is still possible to eliminate the feeding liner by making use of the inner surface of the cylinder case for the passage of the welding electric current.

As has been described, in the portable gun type resistance welder of the invention, the pressurizing cylinder which passes a large welding current between welding electrodes plays also the role of the electric power feeding cylinder. This arrangement basically eliminates the connection of a flexible tube for the electrode carried by the movable piston of the pressurizing cylinder, so that various troubles such as breakage of the cord, short-circuit and so forth are fairly avoided to ensure quite a safe welding operation. For the same reason, troublesome work for inspection, replacement of parts and other protective maintenance operations are eliminated to improve the rate of operation of the welder.

The elimination of the flexible tube also permits the space for flexing of the flexible tube to be saved, so that the space occupied by the welder apparatus is decreased correspondingly to provide a more compact construction of the welder. In consequence, the maneuvering characteristic is improved to ensure a higher precision of the welding.

According to the invention, the inner surface of the cylinder case of the pressurizing cylinder is used as the electric power feeding means and the electrode on the end of the rod is electrically connected to the latter. The power supply from the power feeding means is made through the collector ring which makes contact with the rod and a selective electrical contact with the collector plate contacting the rod. Therefore, the electrical contact is made in conjunction with a certain pressure contact so that the electric power is supplied without substantial generation of heat during the welding operation. Furthermore, since the collector plate is pressed toward the electrode by the piston through the medium of the collector ring, it is possible to maintain a sufficiently large surface contact pressure over the entire period of the welding operation, making up for the reduction of pressure due to the reduction of the work thickness during the welding, so that the resistance welding is achieved at a high quality.

What is claimed is:

1. A resistance welder comprising a pressurizing cylinder, a first electrode attached to the end of a rod inside said pressurizing cylinder and a second electrode attached to an arm secured to said pressurizing cylinder, characterized in that said pressurizing cylinder also serves as an electric power feeding cylinder, said pressurizing cylinder slidably receiving a piston provided with a collector plate electrically connected to said rod attached to said first electrode, said collector plate being electrically contacted by a collector ring which is adapted to radially expand to make selective electrical contact with the inner surface of said cylinder, and a spring interposed between said piston and said collector plate.

2. A resistance welder as claimed in claim 1, wherein said collector ring is clamped between said piston and said collector plate and is clamped to contract radially inwardly by a ring, said collector ring being in contact with said piston through a tapered surface thereof.

3. A resistance welder as claimed in claim 1 or 2, wherein said collector plate possesses a thickness which permits a forward flexing of said collector plate.

4. A resistance welder as claimed in claim 1 or 2, characterized in that a feeding liner is provided on the inner peripheral surface of said cylinder.

* * * * *